(12) United States Patent
Ran (10) Patent No.: US 7,844,500 B2
(45) Date of Patent: Nov. 30, 2010

(54) METHOD FOR MATCHING VENDORS WITH CONSUMERS

(75) Inventor: Assaf Ran, Kew Gardens, NY (US)

(73) Assignees: Manhattan Bridge Capital, Inc., New York, NY (US); Ocean-7 Development, Inc., New York, NY (US)

( * ) Notice: Subject to any disclaimer, the term of this patent is extended or adjusted under 35 U.S.C. 154(b) by 1284 days.

(21) Appl. No.: 11/323,918

(22) Filed: Dec. 30, 2005

(65) Prior Publication Data

US 2007/0118435 A1    May 24, 2007

Related U.S. Application Data (60) Provisional application No. 60/737,879, filed on Nov. 18, 2005.

(51) Int. Cl.
*G06Q 30/00* (2006.01)
(52) U.S. Cl. .......................................................... 705/26
(58) Field of Classification Search .................. 705/26, 705/27
See application file for complete search history.

(56) References Cited

U.S. PATENT DOCUMENTS

| | | | |
|---|---|---|---|
| 5,842,178 | A | 11/1998 | Giovannoli |
| 6,131,087 | A | 10/2000 | Luke et al. |
| 6,574,608 | B1 | 6/2003 | Dahod et al. |
| 6,578,011 | B1 | 6/2003 | Forward |
| 6,601,043 | B1 | 7/2003 | Purcell |
| 2002/0010608 | A1 | 1/2002 | Faber et al. |
| 2002/0023042 | A1 | 2/2002 | Solomon |
| 2002/0038219 | A1 | 3/2002 | Yanay et al. |
| 2002/0038233 | A1 | 3/2002 | Shubov et al. |
| 2002/0059095 | A1 | 5/2002 | Cook |
| 2002/0082974 | A1 | 6/2002 | Berstis |
| 2002/0147674 | A1 | 10/2002 | Gillman |

(Continued)

FOREIGN PATENT DOCUMENTS

EP    0407026 A2    1/1991

(Continued)

OTHER PUBLICATIONS

Anthony Palazzo, Wall Street Journal. (Eastern edition). New York, N.Y.: Aug. 18, 1999. p. B.9.A http://proquest.umi.com/pqdweb?did=43984910&sid=2&Fmt=3&clientId=19649&RQT=309&VName=PQD.*

(Continued)

*Primary Examiner*—Mila Airapetian
(74) *Attorney, Agent, or Firm*—Rajesh Vallabh; Foley Hoag LLP (57) ABSTRACT

An online system is disclosed for matching vendors with consumers. Vendors pay a subscription fee to be listed with the system. Software automatically matches vendors with consumer requests based upon the category of goods and/or services described in the request and the geographical area (e.g., zip code) in which the goods and/or services are needed. The system alerts vendors of matching leads and allows the vendors to decide, at their discretion, whether to pursue the lead. The system has built in capacity to grow. If the system fails to generate a match for a consumer request, or a sufficient number of matches, the system notifies customer service personnel, who attempt to find unlisted vendors that match the consumer's needs. The unlisted vendors are then invited to be listed with the system.

8 Claims, 10 Drawing Sheets

U.S. PATENT DOCUMENTS

| | | |
|---|---|---|
| 2002/0174051 A1 | 11/2002 | Wise |
| 2002/0178045 A1 | 11/2002 | Kraft et al. |
| 2002/0184135 A1 | 12/2002 | Zakaria |
| 2003/0018558 A1 | 1/2003 | Heffner et al. |
| 2003/0028469 A1 | 2/2003 | Bergman et al. |
| 2004/0049450 A1 | 3/2004 | Lussler |
| 2004/0199412 A1 | 10/2004 | McCauley |
| 2005/0010484 A1 | 1/2005 | Bohannon et al. |
| 2005/0038688 A1 | 2/2005 | Collins et al. |
| 2005/0149410 A1 | 7/2005 | Livesay |
| 2005/0171862 A1 | 8/2005 | Duncan |
| 2005/0216364 A1 | 9/2005 | Jurisic et al. |
| 2006/0080127 A1* | 4/2006 | Barry .................. 705/1 |
| 2007/0214032 A1* | 9/2007 | Sciuk .................. 705/8 |

OTHER PUBLICATIONS

Free Home Improvement Contractor Matching Service and Resources, source(s):www.improvenet.com.
Home Improvement Contractor Matching Service, source(s): www.servicemaster.com.
Get Matched to Prescreened Home Improvement Contractors, source(s): www.servicemagic.com.
Professional Plumber Locator, source(s): www.findaplumber.com.
Connect with home improvement contractors in 3 easy steps . . . , source(s) www.homimprovementportal.com.

* cited by examiner

METHOD FOR MATCHING VENDORS WITH CONSUMERS

CROSS-REFERENCES TO RELATED APPLICATIONS

Priority is hereby claimed to U.S. Provisional Patent Application No. 60/737,879, filed Nov. 18, 2005, and entitled, "System and Method for Matching Service Providers with Consumers."

STATEMENT REGARDING FEDERALLY SPONSORED RESEARCH OR DEVELOPMENT

Not Applicable.

REFERENCE TO MICROFICHE APPENDIX

Not Applicable

BACKGROUND OF THE INVENTION

1. Field of the Invention

This invention relates generally to matching vendors with consumers, and, more particularly, to computer implemented and/or assisted systems for matching vendors with consumers using networked media, such as the Internet, cellular phone or messaging networks, POTS telephone networks, cable TV networks, and the like.

2. Description of Related Art

Various methods have been employed for matching vendors that supply goods and/or services with consumers who seek them. One method is the familiar "yellow pages," which provides paper listings of vendors along with descriptions of goods and/or services that the vendors provide. Vendors generally pay for their listings, often based upon the amount of page space their listings occupy.

With the expansion of the Internet, various versions of "yellow pages" have been made available as online directories. Prospective consumers can access these directories, search or browse their listings, and attempt to identify vendors that meet their needs. Vendors generally pay for their listings with these directories, as well.

Referral services are yet another way of matching vendors with consumers. Referral services generally maintain a pool of vendors that they refer out to prospective consumers whose needs match the goods and/or services that the vendors provide. Payment arrangements are varied. Sometimes the vendors pay; sometimes the consumers pay. Just as various yellow pages have been made available online, so have referral services.

We have recognized that a need exists between online directories and online referral services. Although the directories provide a very broad scope of content, their listings are often sparse for the particular category of goods and/or services or the geographical area that is relevant to the consumer. By contrast, referral services tend to be relatively narrow in scope. They tend to focus on specific markets or categories of consumer need and therefore are not generally useful to consumers on a regular and repeating basis. Consumers may turn to a particular online referral service for a plumber, for instance, but generally not for both a plumber and an optometrist.

What is desired, therefore, is a service that combines the breadth of a directory with the specificity and consumer relevance of a referral service. It is also desired that such a service have an appealing fee structure.

SUMMARY

In accordance with an embodiment of the invention, a computer-implemented service is accessible by both vendors that provide goods and services and consumers that seek them. Consumers may access the service to submit a request specifying criteria related to goods and/or services that the desire. Examples of these criteria may include categories of goods and/or services they desire, geographic locations (e.g., zip codes) in which the goods and/or services are needed, and times when the goods and/or services are needed. Vendors may also access the service to inform the service of their capabilities, such as categories of goods and/or services that they supply and the geographical locations (e.g., zip codes) in which they supply them. In response to a consumer's submission of a request, matching software automatically identifies any matches between the consumer's requested criteria and the vendor's identified capabilities. Any matching vendors are automatically notified, whereupon the vendors may contact the consumer. Vendors pay a subscription rate for being listed with the service.

According to one aspect, the subscription rate for a vendor is established based at least in part upon a number of categories and zip codes for which the vendor is listed with the service.

According to another aspect, the service automatically notifies human personnel if no matches, or a small number of matches, are found. The personnel attempt to find unlisted vendors having capabilities that match the consumer's criteria. If the personnel find any such vendor, the personnel attempt to obtain a subscription from that vendor. This aspect of the invention provides a mechanism for enlarging the content stored with the service as time goes by.

According to yet another aspect, the service includes data relating to non-subscribing vendors. The service automatically checks the data for non-subscribing vendors if no matches, or a small number of matches, are found for subscribing vendors. The non-subscribing vendors are invited to subscribe to the service.

According to a further aspect, the service automatically checks whether vendors have received consumer requests but have not responded within a predetermined period of time. The service automatically alerts any vendors that have not responded.

BRIEF DESCRIPTION OF THE DRAWINGS

Additional details of the invention will be more clearly understood from the ensuing drawings, in which—

DETAILED DESCRIPTION OF THE PREFERRED EMBODIMENT

Definitions:

The words "comprising," "including," and "having" set forth certain items, steps, elements, or aspects of something in an open-ended fashion. Unless specifically stated to the contrary, these words do not indicate closed lists to which additional things cannot be added.

The word "software" includes any computer or processor-readable code, whether compiled or uncompiled, that performs a function in a computational system or device. Thus, for example, "software" can include a single line of code or a single encoded expression. "Software" can also include larger sections of code or modules. It can include code distributed among different sections, modules or physical locations. "Software" includes both code that is readily changeable and code that is permanently fixed in a computer or other processing device.

The word "consumer" refers to any person or entity seeking a good or service. The consumer need not be human; it may also be a non-human entity such as a company or organization. The word "consumer" also includes a person or entity operating as an agent or representative for an individual or entity seeking a good or service.

The word "vendor" refers to any person or entity that represents itself as a supplier of at least one good or service. The vendor need not be human; it may also be a non-human entity such as a company or organization. The word "vendor" also includes a person or entity operating as an agent or representative for an individual or entity offering a good or service.

The word "listed" when used in connection with a vendor (e.g., "listed vendor"), indicates that the vendor pays a subscription fee with the online service. "Listing" gives vendors preferred treatment. Vendors may be registered with the online service without being "listed." In addition, vendors may be "listed" for certain goods, services, and/or zip codes, but merely registered for others. These vendors received preferred treatment from the goods and/or services and zip codes for which they are listed, but not for others.

The word "service" is used interchangeably with the word "system." Both refer to an arrangement of software and hardware components, which are arranged to serve the needs of vendors and consumers. Human personnel may also be included in the "service" or "system," for augmenting the technology and addressing additional user needs that the technology does not completely address.

Figure 1:
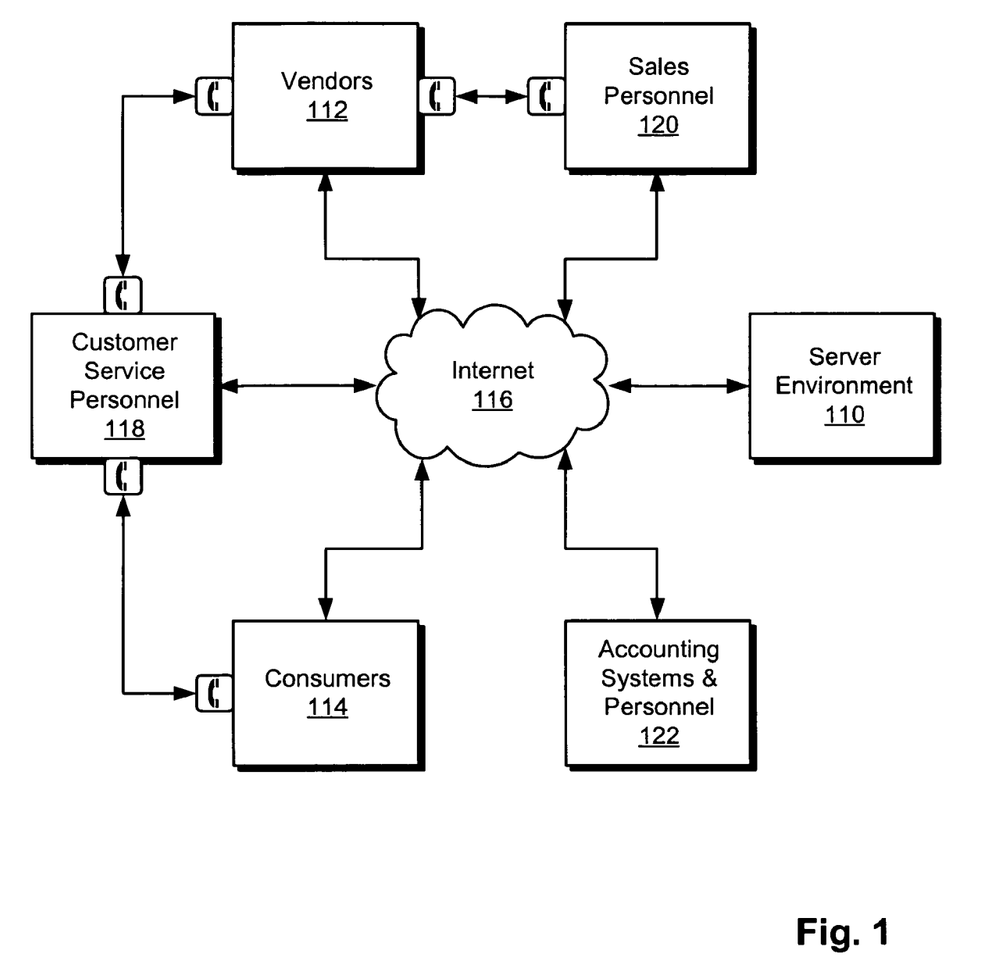
FIG. 1 is a block diagram that shows how different types of users can communicate with one another and with a server environment when using a matching service according to an embodiment of the invention.
Figure 2:
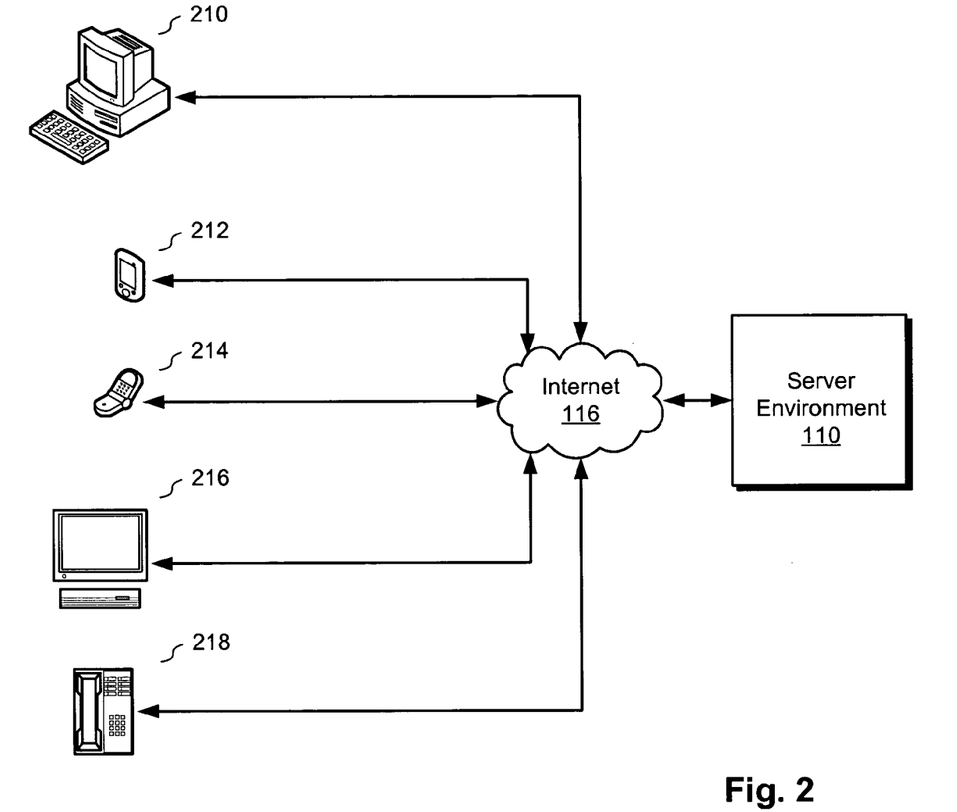
FIG. 2 is a block diagram that shows different technologies that can be used to access the server environment shown in FIG. 1.
Figure 3:
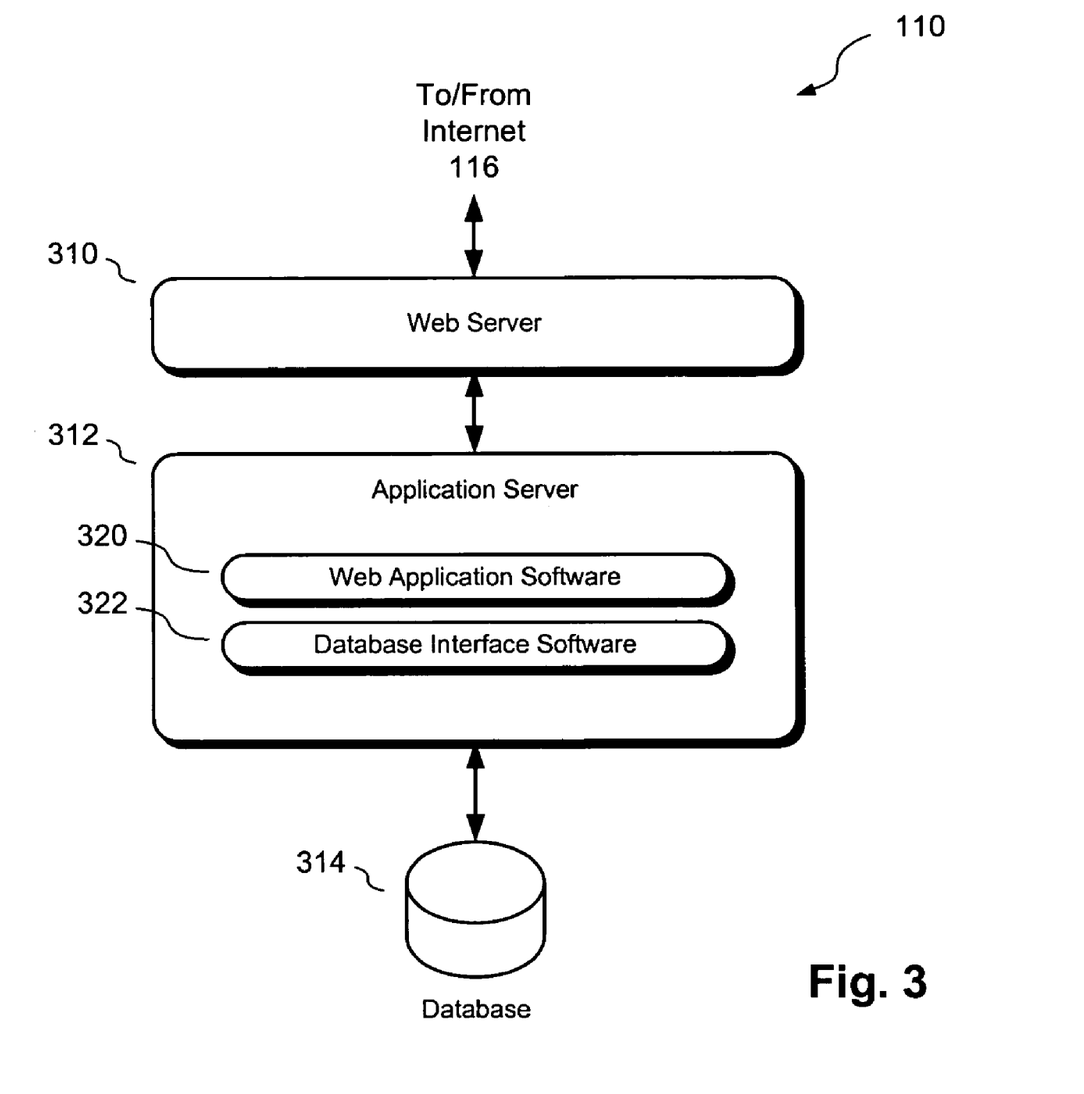
FIG. 3 is a block diagram of the server environment of FIGS. 1 and 2.

Structure and Operation:

FIGS. 1-3 show various physical aspects of an online service, according to an embodiment of the invention, for matching consumers with vendors.

As shown in FIG. 1, the online service is arranged to allow different types of users to communicate with one another and to communicate with a server environment 110. The users communicate via the Internet 116. The types of users include vendors 112 and consumers 114, as well as users that support the operation of the online service, such as customer service personnel 118, sales personnel 120, and accounting systems and personnel 122.

The online service also prescribes that certain types of users be accessible to one another via telephone. For example, customer service personnel 118 have telephone access to vendors 112 or consumers 114, and sales personnel 120 have telephone access to vendors 112 (and prospective vendors). Of course, any type of user can contact any other type of user by telephone. However, the telephone connections shown are particularly relevant to processes supported by the online service.

FIG. 2 shows various technologies that users of the online service may employ for connecting to the Internet 116. A user may employ a computer 210, such as a personal computer, workstation, or mainframe. Preferably, the computer 210 is configured with a web browser and has access to email. A user may also use a personal data assistant (PDA) 212, cellular telephone 214, cable or satellite television 216, or Plain Old Telephone System (POTS) telephone 218, which is properly configured for Internet access. These devices are preferably equipped with web browsing software and access to email. The technologies shown in FIG. 2 do not form an exhaustive list of ways in which a user may connect to the Internet 116. They are merely provided as examples.

FIG. 3 shows the software structure of the server environment 110. The server environment 110 includes a web server 310, an application server 312, and a data collection, such as a database 314. These components can be housed on a single computer. Alternatively, they can be split among different computers that are networked together.

The web server 310 has access to the Internet 116 via the Internet connection of its hosting computer. Preferably, a commercial, off-the-shelf web server is used, such as Sun One™ from Sun Microsystems, Inc., Microsoft IIS™ from Microsoft Corporation, or Apache™ from the Apache Software Foundation.

The application server 312 preferably runs web application software 320 and database interface software 322. The web application software 320 has access to the web server 310 for exchanging information with users. It also has access to the database interface software 322, for reading from and writing to the database 314. The application server 312 is preferably commercially available software, such as Apache Tomcat™, Microsoft IIS, WebSphere™ from IBM, or Mod_Perl™ from the Apache Software Foundation.

The web application software 320 includes software for performing various functions. These preferably include managing user interfaces, processing user data, managing user accounts, and emailing users. They also preferably include billing functions, such as collecting billing information from vendors and forwarding the information to a third party that supports online payments. Examples of suitable third parties include PayPal®, Authorize.Net™, and LinkPoint®.

The web application software 320 can be written in any suitable language or combination of languages. Suitable examples include HTML, XTML, Java, Java Server Pages (JSP), Perl, PHP, Microsoft Active Server Pages (ASP), and Microsoft ASP.net.

The database interface software 322 is preferably third party software. This software forms a bridge between the web application software 320 and the database 314. Examples of database interface software include Open Database Connectivity (ODBC) drivers.

The database 314 is preferably a relational database. It is a central repository for storing information related to the various users of the online service and the operation of the online service. It preferably stores information about consumers and vendors, including registration and account information, information about consumer requests, and tracking information. At the time of this writing, the preferred choice for the database 314 appears to be PostgreSQL 8.1, from the PostgreSQL Global Development Group. Other suitable choices are available, however, such as MYSQL, Microsoft® SQL Server, and Oracle®.

Although a relational database is strongly preferred, it is not strictly required. Alternatively, the data collection can be implemented as any organized arrangement of data, including XML files, text files, or other files, organized as flat structure or as a hierarchy of files or folders.

Figure 4:
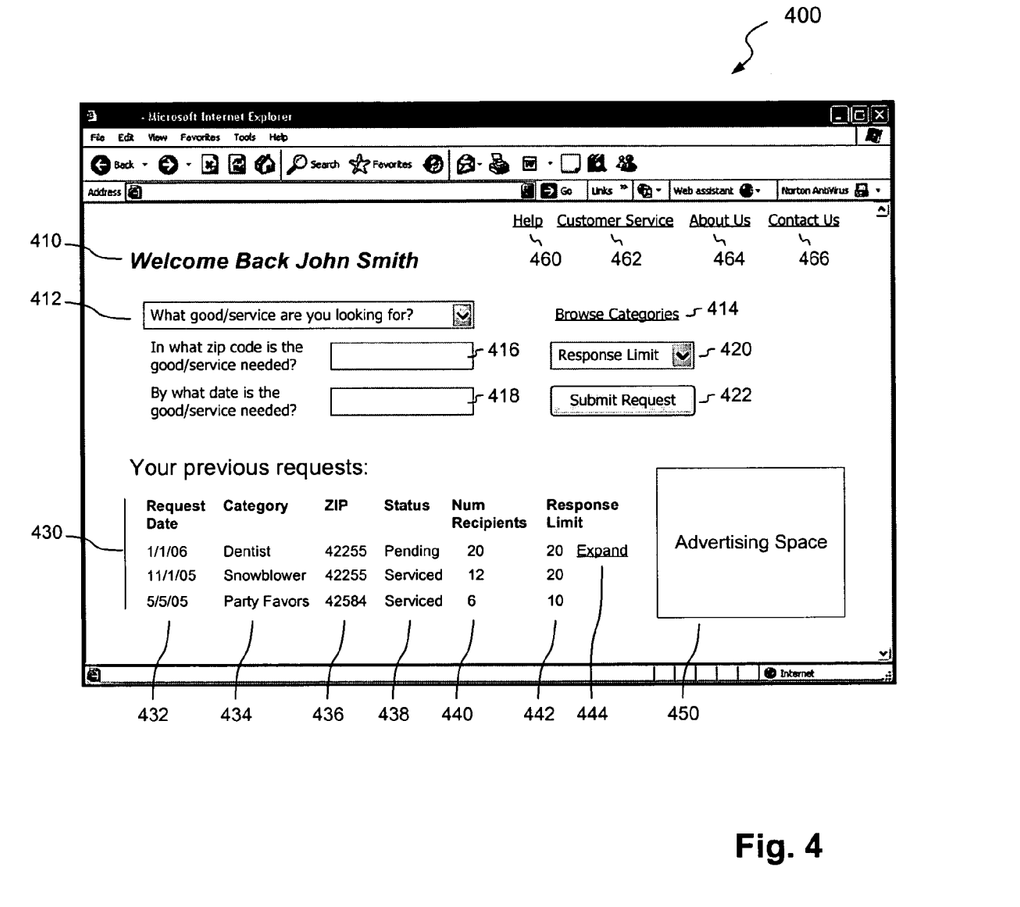
FIG. 4 is a screen shot of a web page that is accessible to a consumer for submitting a request with the matching service for a good or service.

The online service is preferably arranged to display different web pages to different types of users. FIG. 4 shows an example of a web page 400 that the online service displays to a consumer. The consumer's name is identified with text 410. The page 400 includes elements 412, 416, 418, 420 and 422 that allow a consumer to specify criteria for submitting a request for a good or service. Preferably, these elements are implemented as parts of an HTML form.

Element 412 allows a consumer to select a desired category of good or service. It is preferably a dynamic pull-down menu. A great many categories are available from this menu. To present these choices to the consumer in a user-friendly manner, the control 412 preferably arranges categories in different layers. Each layer presents a relatively short list of categories, through which the consumer can scan for selecting the choice best suited to his or her request. Once a selection is made at a first layer, a second layer appears which displays a new list of choices. The new choices are subcategories of the category selected at the first layer, and are thus more specific than those at the first layer. The consumer proceeds to "drill down" through different layers in this fashion until the specific desired category is found. The consumer then selects the desired category.

For example, assume that a consumer accesses the page 400 to find a designer for a new home theater. That user might make the following selections in arriving at the desired category:

Layer 1: Home Improvement (User selects this option at layer 1)
   Layer 2: Home Theater (User selects this option at layer 2)
      Layer 3: Designers (User selects this option at layer 3)

According to one variant, element 412 is implemented as a freeform text field. A consumer enters into this field his or her best guess for a desired category name. As the consumer types, the service displays a list of categories whose first characters match the consumer's input on the consumer's screen immediately below the element 412. If the consumer's desired category name appears on the list, the consumer can select it. If it does not appear, the consumer can continue to type his or her best guess for the category name. If the consumer submits a request with an "original" category name (i.e., one that does not appear on the displayed list), the service attempts to classify it with an existing category name. If none exists, the service may add a new category name based upon the consumer's request.

Text box 416 is provided for accepting information from the consumer pertaining to the geographical location where the desired good or service is needed. Preferably, this information is requested in the form of a zip code. Alternatively, other forms of geographic information may be requested, such as using regional or other geographic designations.

Text box 418 allows a consumer to specify when the requested good or service is needed. This information is preferably a date, such as "Jan. 15, 2006."

List box 420 allows a consumer to specify a maximum number of responses to be received for a request. Preferably, the list box 420 provides the user with a limited number of choices, such as 3, 5, 10, or 20. Giving the consumer this choice prevents the consumer from being overwhelmed in the event that the consumer's request generates a large number of matches.

A submit button 422 is provided for directing the consumer's request (e.g., the category, zip code, date needed, and desired number of responses) to the server environment 110, where the request can be processed.

The page 400 preferably includes features for assisting the user in selecting the desired category. For instance, an element, such as a link 414, allows the user to browse different available categories. Another element, such as a link 460, allows the consumer to request help in selecting a desired category.

The page 400 preferably also includes a validation script for checking all consumer data before transmitting the request to the server 110. The script prompts the consumer to correct any errors. The validation script may be written in any suitable scripting language, such as JavaScript or VBScript.

The web page 400 includes elements for displaying information related to the consumer's previous requests. These elements are preferably organized in a table 430, which lists the consumer's requests in reverse chronological order. For each previous request, the table 430 preferably shows the request date 432, category 434, zip code 436, and response limit 442, which the consumer entered when submitting the request. The table 430 also indicates a status of the request 438 (e.g., pending or serviced) and a number of recipients 440 to which the request was sent. If the number of recipients (i.e., vendors receiving the request) equals the response limit for a request, an element such as a link 444 ("Expand") is displayed. Clicking this link opens a window that allows a consumer to expand the circle of vendors that are notified of the request. Using that window, a consumer can increase the response limit for the respective request and prompt the online service to search for additional matches. The consumer may also be allowed to broaden the search criteria (e.g., category and/or zip code) in an effort to obtain more matches. According to one variant, the link 444 is displayed for each request, regardless of whether the response limit equals the number of recipients.

The web page 400 may include advertising space 450 for displaying advertisements to the consumer. The advertisements may be general to all consumers, or they may be specifically targeted to the particular consumer (e.g., "John Smith") based upon the consumer's registration information and/or request history. The page 400 preferably also includes a "Customer Service" link 462, an "About Us" link 464, and a "Contact Us" link d466, near the top of the page, for allowing a consumer to obtain help and easily navigate around the site.

Figure 5:
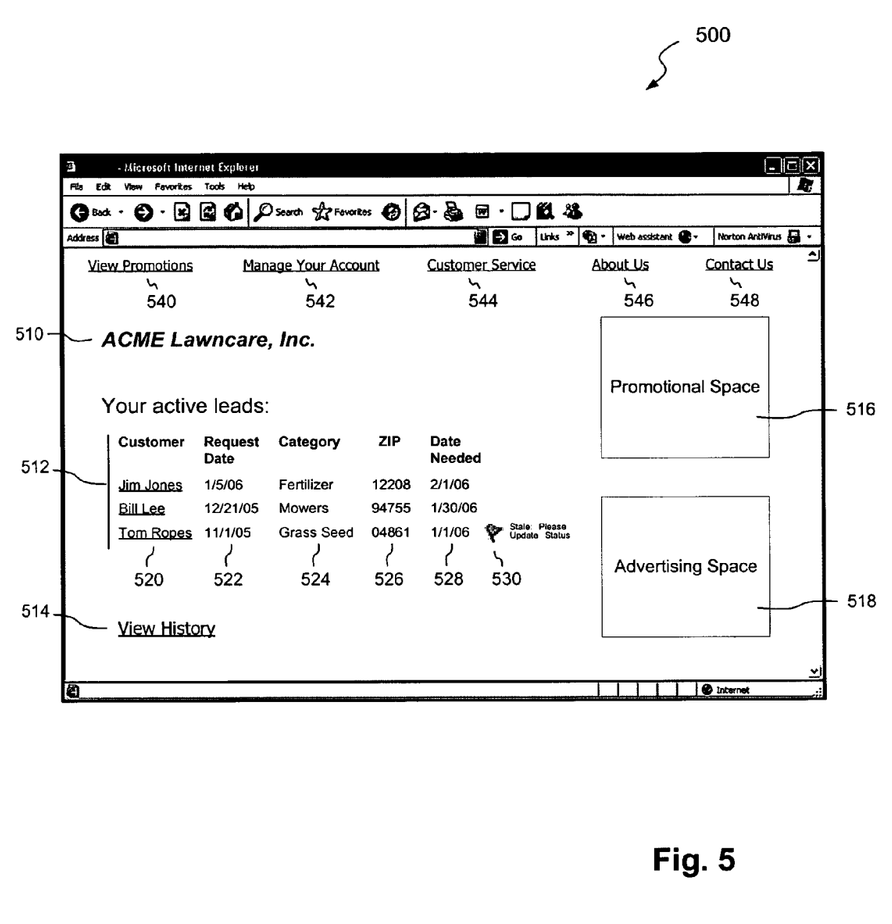
FIG. 5 is a screen shot of a web page that is accessible to a vendor for viewing leads to which the vendor has been matched by the matching service.

FIG. 5 shows an example of a web page 500 that the online service presents to a vendor. The page 500 includes an element 510 that identifies the vendor, such as "ACME Lawncare, Inc."

The page 500 displays a table 512 of active leads for the vendor. Each "lead" represents a consumer request that the online system has matched to the vendor. The table 512 preferably lists, for each lead, the consumer (or "customer") name 520, the request date 522, the category 524 and zip code 526 from the consumer's request, and the date 528 on which the requested good or service is needed. Leads are preferably listed in reverse chronological order, based upon request date. Leads that are stale, i.e., neither serviced nor refused within a predetermined period of time, such as one month, are marked with a red flag 530. The red flag 530 alerts the vendor that a response is needed.

The table 512 preferably lists only active leads. Leads that have already been serviced or refused are preferably not shown. These may be viewed, however, by accessing an element, such as link 514, for viewing the vendor's history.

The web page 500 preferably includes promotional space 516 and advertising space 518. The promotional space 516 is used to promote opportunities to the vendor for using the online service and exploiting additional benefits. Information about sales or special discounts may be provided in this space. The advertising space 518 preferably displays third party advertisements. These may be applicable to vendors in general, or they may be specifically targeted to the particular vendor.

A list of links preferably appears at the top of the page 500. As with the page 400, the list includes a "Customer Service" link 544, an "About Us" link 546, and a "Contact Us" link 548. In addition, the page 500 includes a "View Promotions" link 540, which allows the vendor to access promotions from the online service. Because the vendor is actually the paying client of the online service, the page 500 preferably also includes a "Manage Your Account" link 542. This link allows the vendor to enter or change account information, such as company name, billing address, email address, and credit card information.

Preferably, each "Customer Name" on the lead list 512 is presented as a link to a page that lists details of the respective lead and allows the vendor to manage the lead. For instance, the vendor can view and manage the lead for "Jim Jones" by clicking the text, "Jim Jones" on the lead list 512.

Figure 6:
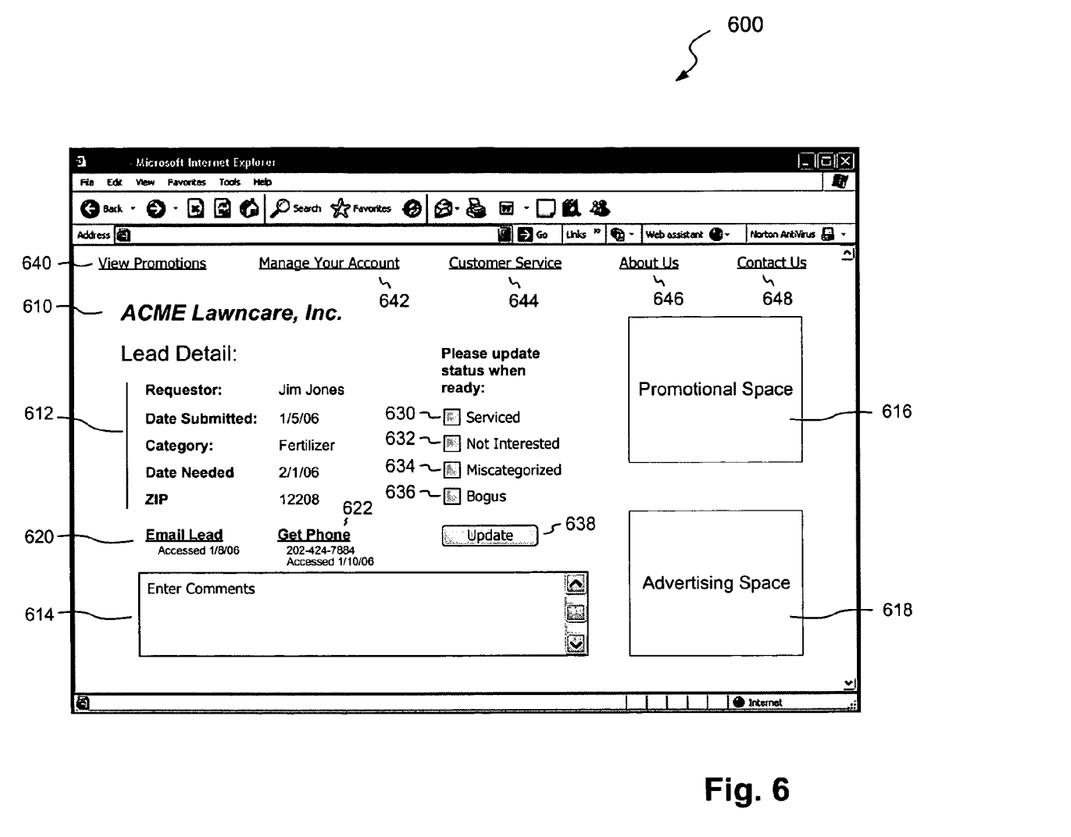
FIG. 6 is a screen shot of another web page that is accessible to a vendor that shows the details of a particular lead listed in FIG. 5.

FIG. 6 shows an example of a web page 600, which provides details for each lead. The web page 600 is invoked when the vendor clicks a customer name in the list 512. In this example, lead for "Jim Jones" is accessed when the vendor, ACME Lawncare, clicks the customer name "Jim Jones" in the lead list 512.

The page 600 includes a summary 612 of the request, which identifies the requesting consumer, request date, category, date needed, and zip code. The page 600 also includes elements for updating the status of the lead. An element, such as a checkbox 630, allows the vendor to indicate whether the vendor has serviced the lead, such as by contacting the requesting consumer and providing the requested good or service. Another element, such as a checkbox 632, allows the vendor to indicate that the vendor is not interested in pursuing the lead. Yet another element, such as a checkbox 634, allows the vendor to indicate that the vendor believes that the lead has been miscategorized. A further element, such as a checkbox 636, allows the vendor to indicate that the vendor believes the lead to be improper or harassing (i.e., "bogus").

The page 600 includes a further element, such as a text area 614, to allow the vendor to enter comments about the lead. This is a free form section for assisting the vendor in managing the lead.

Preferably, the checkboxes (630, 632, 634, and 636) and the text area 614 are parts of an HTML form. A submit button 638 ("Update") is provided for transmitting any changes to the checkboxes or comments to the server environment 210, where they may be recorded in the database 314.

The web page 600 includes elements 620 and 622 for accessing the lead's contact information. These elements are preferably provided as links. By clicking the link 620, a standard "mailto" window is opened that allows the vendor to compose an email message. The address of the email message is automatically set to the requesting consumer's email address, and the reply address is automatically set to the vendor's email address. The subject line and body of the email message may also be filled in automatically. Using this window, the user can compose and send an email to the requester to initiate communication and begin servicing the lead.

By clicking link 622, the page 600 automatically displays the requesting consumer's telephone number. The telephone number may be displayed alongside or below the link 622. Alternatively, it may be displayed in place of the link 622, such that the link 622 is no longer displayed.

Preferably, additional code is associated with the links 620 and 622. One function of this code is to display the date on which the respective link was clicked. The date may appear below the respective link, as shown. Another function is to send a confirmation back to the server environment 110 that the respective link was clicked. The confirmation and the date of confirmation are preferably is recorded in the database 314.

The web pages shown in FIGS. 4-6, or templates thereof, are preferably stored in the web application software 320. A user generally accesses one or more of these pages by opening a web browser on his or her local machine and navigating to the online service via the Internet 116. The user logs on to the service and navigates to the respective page. The page is then downloaded to the user's computer.

In the web page examples given above, the online service automatically fills in content for particular consumers and vendors. This content is variable, being based upon the identity of the user and the time at which the page is accessed. User-specific information is stored in the database 314. When a user requests a page, such as by clicking a link or entering a URL into the user's browser window, the application software retrieves the user-specific data from the database 320 and inserts that data into the requested page. The web server 310 then sends the completed page to the user.

Figure 7:
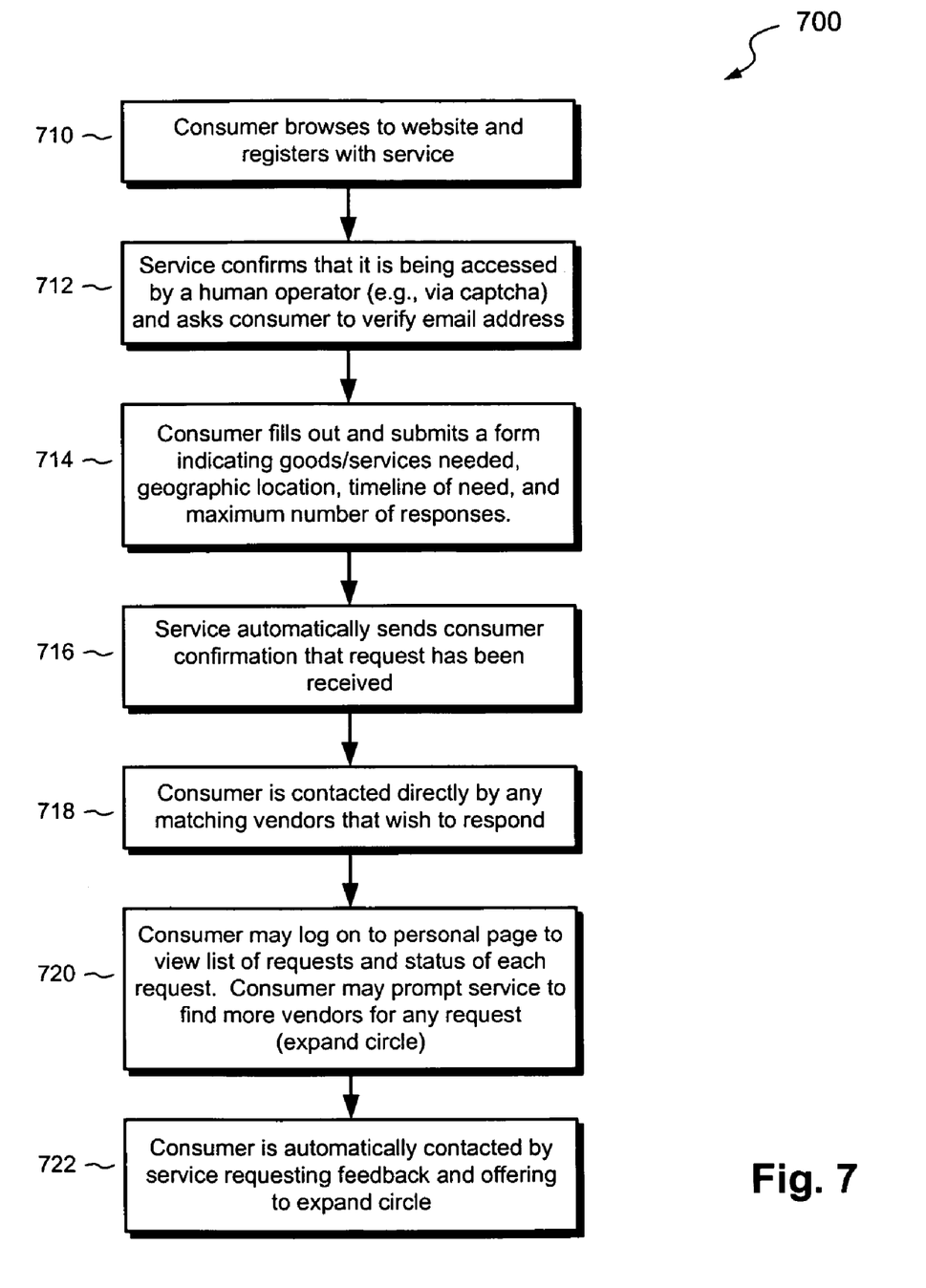
FIG. 7 is a flowchart that shows certain aspects of how the matching service operates from a consumer's point of view.
Figure 8:
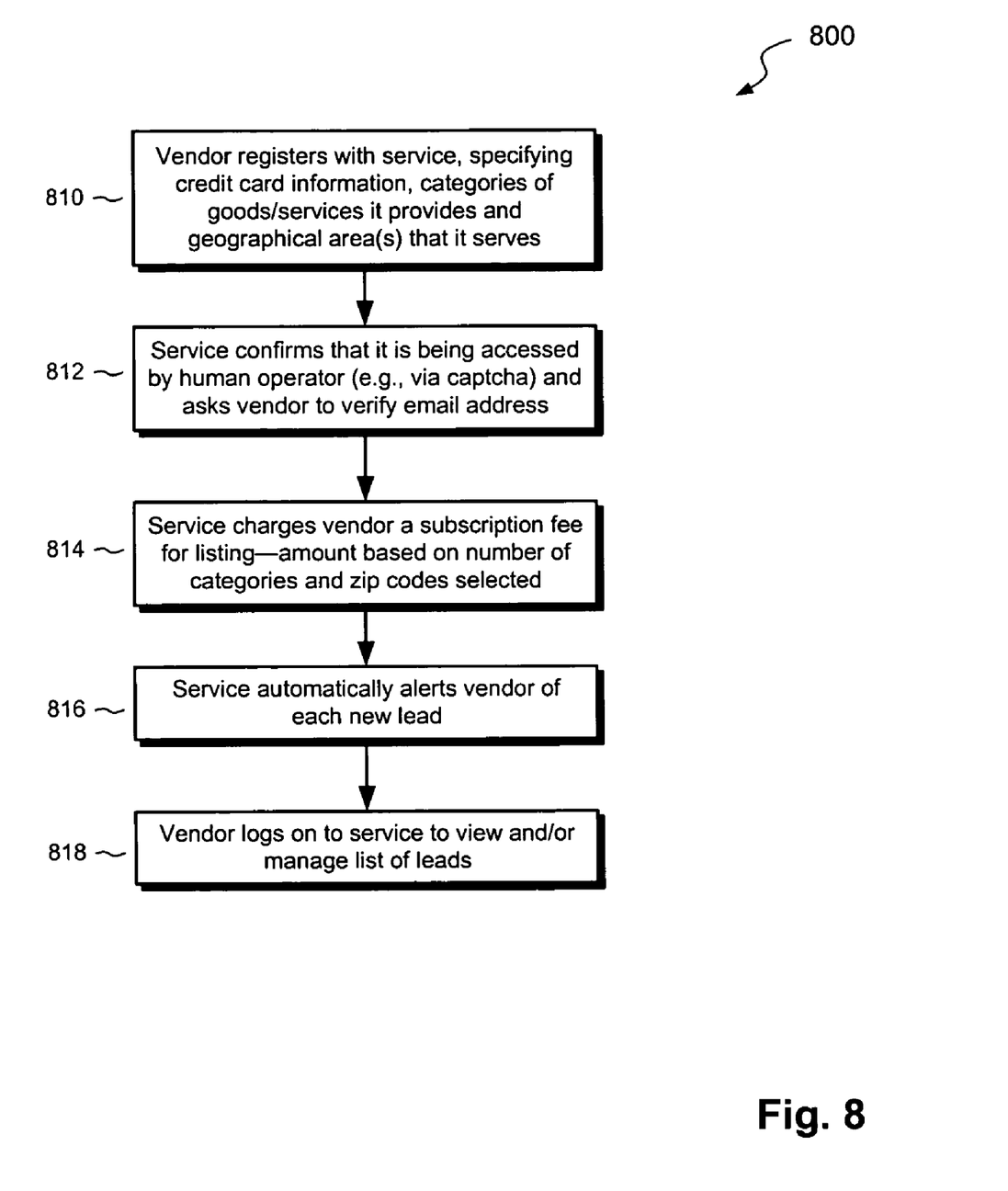
FIG. 8 is a flowchart that shows certain aspects of how the matching service operates from a vendor's point of view.
Figure 9:
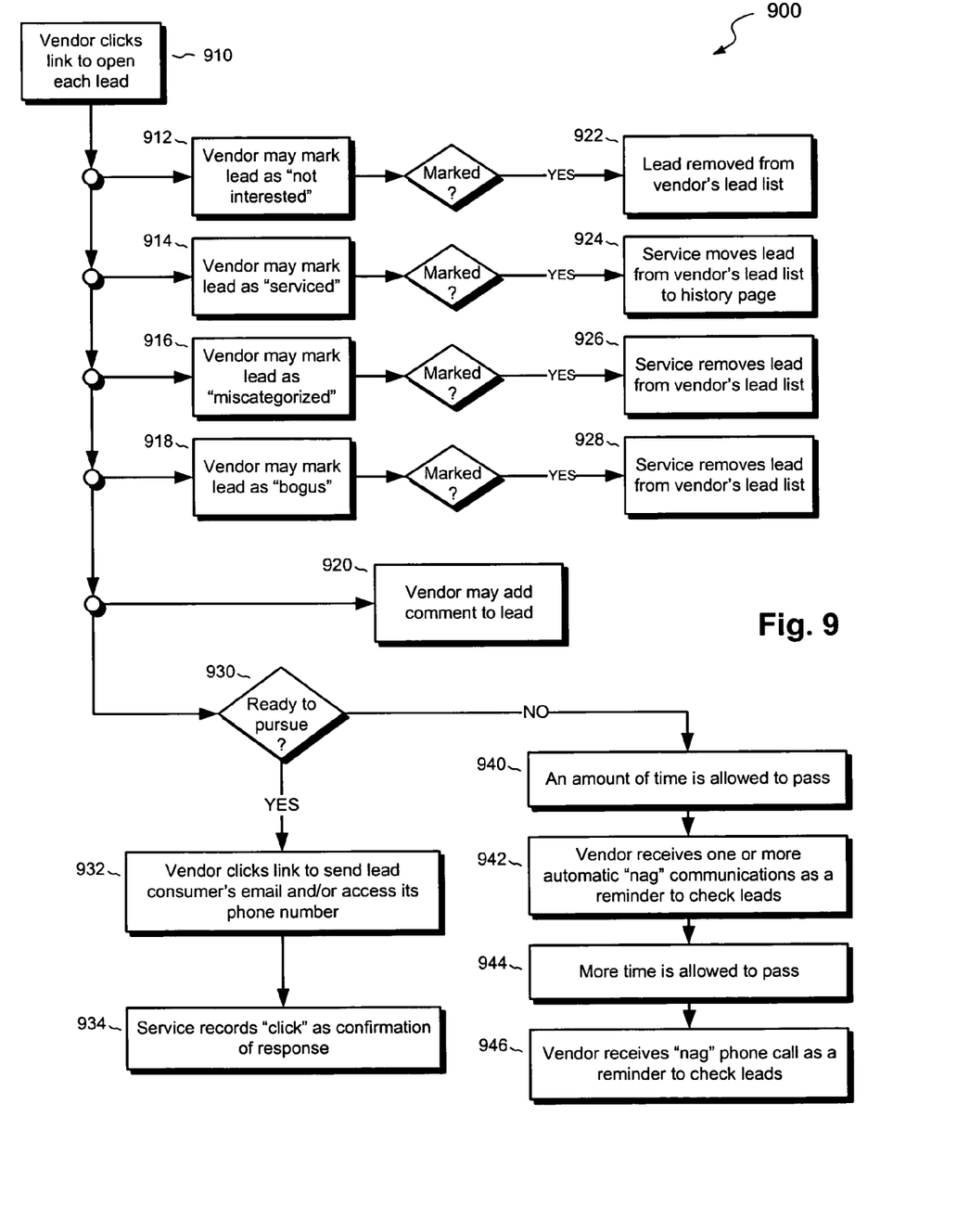
FIG. 9 is a flowchart that shows certain aspects of how a vendor can manage its leads.

FIGS. 7-9 illustrate the operation of the online service from the viewpoint of different users.

FIG. 7 shows certain aspects of the service's operation from the consumer's point of view. As shown in FIG. 7, a consumer desiring to use the online service browses to the service's website and registers with the service (Step 710). Consumer registration generally involves the service prompting the consumer to enter a name, address, and email address. The consumer is also preferably prompted to select a username and password.

At step 712, the online service preferably requires that the consumer confirm that he or she is a human operator. For example, the consumer may be asked to enter characters displayed in a "CAPTCHA" (completely automated public Turing test to tell computers and humans apart). The on-line service may also (or instead) require that the consumer verify his or her email address. This may be done, for example, by sending the consumer an email message containing a link that the consumer must click to confirm his or her identity.

At step 714, the consumer is prompted to fill out and submit a request form specifying a desired good or service, such as the form shown in FIG. 4. The service automatically sends an email message to the consumer confirming that the request has been received (step 716). The service then attempts to match vendors with the request and notifies any matching vendors. At step 718, the vendors matched with the request may directly contact, at their option, the consumer that submitted the request. The consumer may then proceed to conduct business with the vendor, or wait to hear from another vendor.

At any time, the consumer may log onto the service, as shown at step 720, to view a list of outstanding requests (e.g., list 430). The consumer may prompt the service to "expand the circle," of a request, i.e., search for additional vendors that match, or substantially match, the request, as described above.

As shown at step 722, after a predetermined amount of time is allowed to pass, the service automatically sends the consumer an email message. The email message asks the consumer for feedback regarding the consumer's experience with the service and offers the consumer the option of expanding the circle of vendors.

FIG. 8 shows certain aspects of the service's operation from the point of view of a vendor. At step 810, a vendor registers with the online service. Since the vendor is the paying customer of the online service, the vendor is prompted to enter billing information, which preferably includes credit card information. The vendor is prompted to identify its capabilities, e.g., the specific categories of goods and/or services for which it would like to be listed with the service and the geographical areas, such as zip codes, in which it can supply the listed goods and/or services. The vendor may also enter additional categories of goods, services, and/or zip codes, for which the vendor does not wish to be listed (i.e., does not wish to pay a subscription fee).

At step 812, the service preferably confirms that it is being accessed by a human operator. This is done as described above for consumers, using a CAPTCHA and/or a verification of the user's email address.

At step 814, the service charges the vendor a subscription fee. Preferably, the service maintains the vendor's credit card information and charges the credit card on a monthly basis. The charge is preferably computed based upon the number of categories of goods and/or services and the number of zip codes for which the vendor is listed with the service. To illustrate this fee arrangement, assume that a service is offered to vendors at a rate of ten dollars per category per zip code. A vendor requesting to be listed for two categories in one zip code would then be charged twenty dollars per month, whereas a vendor requesting to be listed for two categories in two zip codes will be charged forty dollars per month.

We have recognized that some zip codes include many more households and/or businesses than others. The fee structure may be adjusted to account for this. For instance, according to one variant, the service may charge higher fees for zip codes that are more populated with target consumers. Lower fees may be charged for zip codes that are less populated with target consumers.

At step 816, the service alerts the vendor of each new lead. The vendor is preferably alerted by an email message that the service automatically sends to the vendor's email address. At step 818, the vendor may log onto the service to view and/or manage the new lead, as well as leads that were submitted previously (see FIGS. 4 and 5).

FIG. 9 shows how a vendor can use the online service to view and/or manage particular leads. At step 910, the vendor clicks on a link to view detailed information about each lead. The vendor can do this, for example, by clicking the customer name 520 on the lead list 512 of FIG. 5, to bring up the page 600 of FIG. 6.

If the vendor is not interested in pursuing the lead, the vendor may mark the lead "Not Interested" at step 912. The service then removes the lead (step 922) from the vendor's lead list 512.

If the vendor has serviced the lead, e.g., by supplying the requested good or service to the consumer, the vendor may mark the lead "Serviced" at step 914. At step 924, the online service removes the lead from the vendor's lead list 512 and adds it to the vendor's history page. The history page is accessible via the link 512, shown in FIG. 5.

If the vendor believes that the lead has been mismatched with the vendor, the vendor may mark the lead "Miscategorized" at step 916. At step 926, the online service then removes the lead from the vendor's lead list 512. In addition, if the vendor believes that the lead is improper or harassing, the vendor may mark the lead "Bogus," after which the service removes the lead from the vendor's lead list 512 (step 928). The vendor may also add comments to the lead at step 920.

The service allows the vendor to choose if and when to pursue the lead. At step 930, the vendor decides whether it is ready to pursue the lead. If it is ready, the vendor takes a first step toward contacting the requestor at step 932. The vendor does this, for example, by clicking one or more of the elements 620 and 622, shown in FIG. 6, to send an email to the lead or get the lead's telephone number. At step 934, the service records the vendor's action of clicking either of these links as a confirmation that the vendor has responded to the lead. The confirmation is stored in the database 314.

The vendor may then pursue the lead with the requesting consumer. Once the good or service is provided, the vendor marks the lead "Serviced," such as by clicking the checkbox 630 in FIG. 6 and clicking the "Update" button 638.

If the vendor is not ready to pursue the lead, the online service waits a predetermined period of time (step 940) for the vendor to perform some action with regard to the lead. This action may include changing the status of the lead (by checking Not Interested, Serviced, Miscategorized, or Bogus) or accessing the email and/or phone information of the consumer via elements 620 and/or 622. If the vendor fails to perform any of these actions within the time limit, the service alerts the vendor at step 942, preferably with an automatic email. This "nag" email reminds the vendor to check its leads.

At step 944, a second predetermined amount of time is allowed to pass. If the vendor has not serviced the lead after the second time limit passes, the online service alerts a customer service representative (step 946). Preferably, the service posts a message to a message queue managed by customer service personnel. A next available customer service representative reads the message and responds by placing a telephone call to the vendor, reminding the vendor to check leads and offering to assist the vendor if possible.

According to one variant, a first nag email is sent n days after the vendor receives the lead, and a second nag email is sent 2*n days later. If the vendor still has not serviced the lead after 3*n days, customer service is prompted to contact the vendor.

Figure 10:
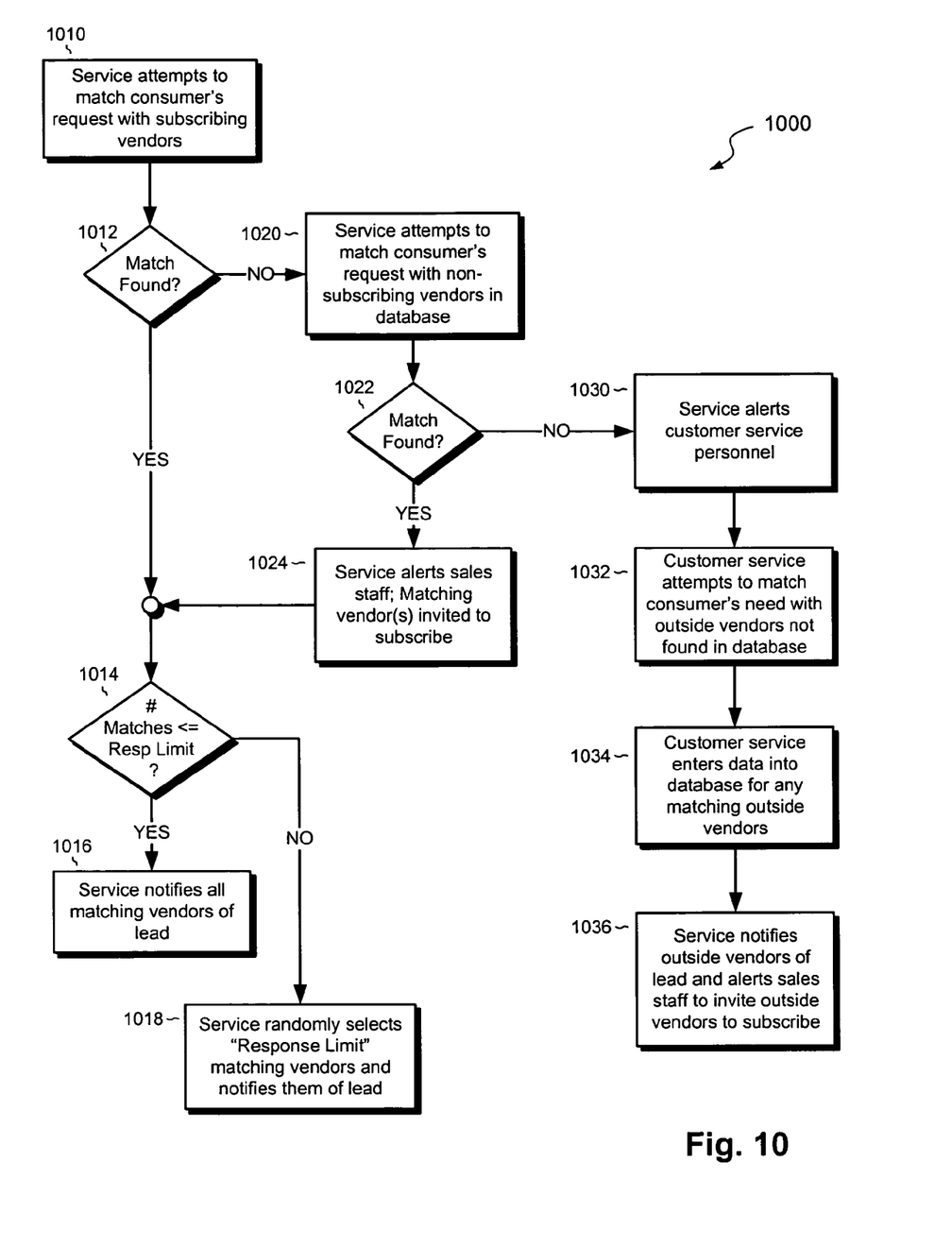
FIG. 10 is a flowchart that shows certain aspects of how the matching service performs its matching functions.

FIG. 10 shows a process that the online service uses for matching consumer requests with vendors. Before describing the details of this process, it should be noted that the vendor information stored in the database 314 need not be limited to information about subscribing vendors. Information about non-subscribing vendors may also be stored. These data may be entered by sales personnel, to help populate the service with vendors. They may also be entered by the vendors themselves.

According to one variant, vendors may submit their information and capabilities (e.g., goods and/or services offered and zip codes in which they are offered) with the online service, without paying a subscription fee. As described below, however, non-subscribing vendors are not entitled to priority by the matching software.

According to another variant, vendors may wish to subscribe to the service for certain goods and/or services, but not for others. Likewise, they may wish to subscribe for certain zip codes but not for others. These vendors receive priority by the matching software for the categories and zip codes for which they subscribe, but they do not receive priority for the categories and zip codes for which they do not subscribe.

Proceeding to the matching process, at step 1010 the service attempts to match the consumer's request with capabilities of subscribing vendors. These are the vendors that subscribe to the online service for the particular category and zip code of the consumer's request.

At block 1012, the service determines the number of matches. If the number of matches is greater than zero, control proceeds to block 1014. At this step, the service determines whether the number of matches is less than or equal to the response limit that the consumer specified in the request (see element 420 of FIG. 4). If it is, control proceeds to step 1016, where the service notifies all matching vendors of the lead. If the number of matches is greater than the response limit, however, the service randomly selects a number of vendors equal to the response limit, and notifies those vendors of the lead. Vendors are preferably notified by email, as described above.

Returning to block 1012, if no matches are found to subscribing vendors, control proceeds to step 1020, where the service attempts to match the consumer's request with non-subscribing vendors whose information is already stored in the database 314. These may be vendors that subscribe to the service for certain goods, services, and zip codes, but not for the ones specified in the request. They may also be vendors that do not subscribe to the service for any goods, services, or zip codes.

At block 1022, the service determines whether any matches are found for the non-subscribing vendors. If matches are found, the service alerts the sales personnel of the matches, preferably by posting a message to a message queue managed by sales personnel. The next available sales personnel then contacts the vendor and invite the vendor to subscribe to the service. If the vendor already subscribes for other goods and/or services and/or zip codes, the vendor is invited to subscribe for the good or service and zip code specified in the consumer's request. Preferably, control then proceeds to block 1014, where matching, non-subscribing vendors (up to the response limit) are notified of the lead.

Returning to block 1022, if no matches are found to non-subscribing vendors, control is passed to block 1030, where the online service alerts customer service personnel. Preferably, this is done by posting a message to a message queue managed by customer service. Alternatively, it may be done by sending an automatic email to a customer service representative. At step 1032, a customer service representative attempts to find vendors outside the service (i.e., whose information is not stored in the database) to meet the consumer's need. If any vendors are found, the customer service representative or some other person enters data for the vendors into the database 314 (see step 1034). At step 1036, the online service notifies the vendors of the lead and alerts the sales staff (both, preferably by email). The sales staff then invites the vendors to subscribe.

The process described in FIG. 10 gives preferred treatment to subscribing vendors by attempting to match consumer requests with subscribing vendors first. Non-subscribing vendors, or outside vendors only get the lead if no subscribing vendors are matched.

According to a variant of this process, the service may select non-subscribing vendors not only if zero subscribing vendors are found, but also if a non-zero number of subscribing vendors are found. Thus, for example, block 1012 may be modified from "Match Found?" to "Three or Fewer Matches Found?" The number "three" is chosen arbitrarily in this example. It may be varied as desired.

The same is true for block 1022. The service may search for outside vendors not only if zero matches are found, but also if a non-zero number of matches are found.

The process described in FIG. 10 provides the online service with a capacity for growth. Vendors are regularly added to the database and invited to subscribe. As the number of vendors increases, so does the capacity of the online service for helping to bring consumers and vendors together, across a broad range of goods, services, and locations.

Alternatives

Having described one embodiment, numerous alternative embodiments or variations can be made. For instance, the web pages 400, 500, and 600 show various parts of the user interface of the online service as they appear to users accessing the service by computer. The invention is not limited to computer users, however. As shown in FIG. 2, users may access the online service using a variety of other devices, such as cellular phones, PDAs, cable or satellite televisions, and POTS telephones. Users of these devices may access versions of the pages 400, 500, and 600, which are preferably tailored for their hardware capabilities and browser software.

As described herein, the online service alerts various users of various events by automatically sending the users email messages. Other types of messages can be used, however. For example, text messages may be sent to cell phones or pagers, and SMS messages may be sent to cell phones.

As shown and described, the web pages 400, 500, and 600 each include a variety of elements. As is known, elements displayed on each of these web pages can be split among different web pages, to meet various formatting requirements or to give the pages a pleasing appearance. Therefore, it should be understood that each of these web pages may be implemented as two or more web pages. Similarly, different web pages can be combined into a single page. For instance, the page 500 showing vendor information and the page 600 showing lead details can be combined into a single page that includes the elements of both.

As described herein, the consumer may select a "response limit" for a request, from a fixed list of options, to place a limit on the number of vendors that respond to the request. Alternatively, the choices for response limit can be variable. For example, the online service may establish the choices set based upon the actual number of vendors stored in the database 314 that offer the desired good or service in the consumer's specified zip code. Thus, for example, if there are only five vendors in the database that match the consumers criteria, the choices that the service offers for setting the response limit may be limited to small numbers.

According to another variant, the online service notifies more vendors of a match than the by the consumer's response limit specifies. The service may do this under the assumption that fewer than all vendors who receive a lead will choose to respond. Rather than risking that the service will produce too few responding vendors, the service simply alerts more vendors than the consumer specifies.

As described herein, vendors are billed monthly subscription fees based on the number of categories and zip codes for which they subscribe. However, the service is not limited to this arrangement. For instance, the service may offer discounts for packages encompassing multiple categories and/or zip codes.

Those skilled in the art will therefore understand that various changes in form and detail may be made to the embodiments disclosed herein without departing from the scope of the invention.

What is claimed is:

1. A method of matching consumers that seek goods and/or services with vendors that supply them, comprising:
    charging a plurality of vendors a regular subscription fee;
    storing information indicative of the plurality of vendors and their capabilities for providing goods and/or services;
    receiving from consumers criteria for desired goods and/or services;
    comparing the consumers' criteria with the stored information to identify any matching vendors from among the plurality of vendors that have capabilities that substantially align with the consumers' criteria;
    providing the matching vendors, if any are found, with contact information for consumers with which the matching vendors are matched;
    waiting a predetermined time period after a vendor is provided with a consumer's contact information; and
    after the expiration of the time period, reminding the vendor to contact the consumer or to indicate that the vendor is not interested in conducting business with the consumer,
    wherein the step of reminding the vendor comprises sending an email to the vendor;
    wherein the predetermined time period is a first predetermined time period, and further comprising: waiting a second predetermined time period after the step of reminding the vendor; and after the expiration of the second time period, reminding the vendor again to contact the consumer;
    wherein the step of reminding the vendor again comprises placing a telephone call to the vendor.

2. A method as recited in claim 1, further comprising contacting human personnel if the comparing step fails to reveal a predetermined number of matching vendors.

3. A method as recited in claim 2, wherein the predetermined number of matching vendors is one.

4. A method as recited in claim 2, further comprising the human personnel searching for other vendors, not part of the plurality of vendors, which meet the consumers' criteria.

5. A method as recited in claim 4, further comprising the human personnel providing the other vendors with contact information for consumers.

6. A method as recited in claim 4, further comprising the human personnel soliciting subscriptions from the other vendors.

7. A method as recited in claim 4, further comprising the human personnel storing information indicative of capabilities of the other vendors for providing goods and/or services.

8. A method as recited in claim 1, further comprising:
    storing information indicative of capabilities of a plurality of non-subscribing vendors;
    comparing the consumers' criteria with the stored information to identify any matching non-subscribing vendors from among the plurality of non-subscribing vendors that have capabilities that substantially align with the consumers' criteria; and
    providing the matching non-subscribing vendors, if any are found, with contact information for consumers with which the matching non-subscribing vendors are matched.

* * * * *